July 8, 1969
W. G. CAMPBELL
3,453,931
DRIVE MECHANISM FOR A MACHINE TOOL
Filed Aug. 8, 1966
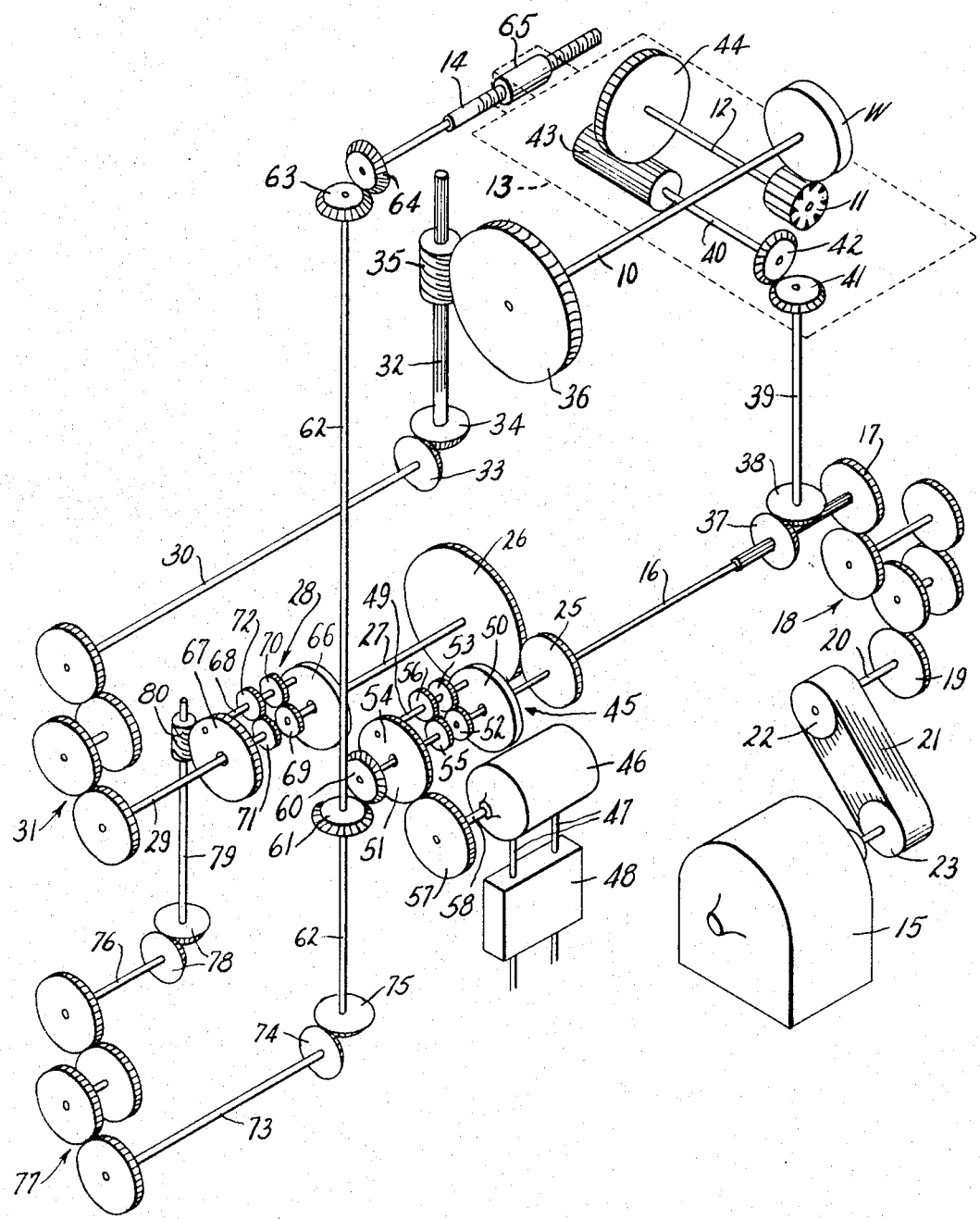
INVENTOR.
William G. Campbell
BY Wolfe, Hubbard,
Voit & Osann
ATTORNEYS United States Patent Office 3,453,931
Patented July 8, 1969

3,453,931
DRIVE MECHANISM FOR A MACHINE TOOL
William G. Campbell, Rockford, Ill., assignor to Barber-Colman Company, Rockford, Ill., a corporation of Illinois
Filed Aug. 8, 1966, Ser. No. 570,963
Int. Cl. B23f 5/22, 9/08; F16h 37/06
U.S. Cl. 90—4                                    5 Claims

ABSTRACT OF THE DISCLOSURE

To increase the range of feed rates available in a hobbing machine while keeping the feed responsive to hob rotation, a differential selectively combines the motion of a main drive motor which rotates the hob with the motion of a reversible hydraulic motor which may be operated at various speeds. The differential applies the resultant motion of the two motors to a hob carriage to shift the latter and to feed the hob at a rate determined by the speed of the main motor and by the selected speed of the hydraulic motor.

---

This invention relates to a drive mechanism for a machine tool such as a hobbing machine and, more particularly, to a drive mechanism which rotates the hob and the workpiece in timed relation while feeding the hob bodily relative to the workpiece. In drive mechanisms of this type, a power driven shaft is used both for feeding and for rotating the hob so that, for a given drive train, the feed will be responsive to hob rotation. The speed of the power shaft is governed by the particular range through which the rotational speed of the hobs is to be varied and, as a result, the available range of feed rates is limited.

The general object of the present invention is to provide a new and improved drive mechanism which feeds the hob relative to the workpiece in response to hob rotation and which, at the same time, is characterized by the ability to vary the feed rate over a range considerably wider than heretofore possible.

A related object is to achieve the foregoing by combining the motion of the power shaft with the motion of a variable speed power source and utilizing the resultant motion for feeding the hob relative to the workpiece.

Other objects and advantages of the invention will become apparent from the following detailed description taken in connection with the accompanying drawing.

The single figure is a perspective view schematically illustrating a drive mechanism embodying the novel features of the present invention.

As shown in the drawing for purposes of illustration, the invention is embodied in a drive mechanism adapted to be incorporated in a hobbing machine such as shown in Patent No. 2,152,469 to which reference may be had for details of construction and operation of the hobbing machine itself. In a machine of this type, the work or gear blank W to be hobbed is secured to a horizontal spindle 10 rotatably supported on a vertically movable work slide (not shown) and power driven in synchronism with a hob 11 fast on a hob spindle 12. The hob spindle is rotatably supported on a shiftable carriage 13 which, during a normal hobbing operation, is advanced by a screw 14 to feed the rotating hob across the rotating workpiece in a direction axially of the latter. It will be understood by those skilled in the art that the hob spindle 12 also may be adapted to be fed tangentially of the workpiece and, in certain instances, a diagonal feed may be employed. Similarly, it will be understood that the various feeds may be produced by shifting the work spindle instead of the tool spindle.

To rotate the work spindle 10 and the hob spindle 12 in timed relation, a primary power source, herein an electric motor 15, drives a main power shaft 16. Fast on one end of the main shaft is a pinion 17 meshing with one of a series of speed change gears 18 which, in turn, are driven by a second pinion 19 on one end of a horizontal shaft 20. An endless belt 21 trained around and tensioned between pulleys 22 and 23 keyed to the opposite end of the shaft 20 and to the drive shaft of the motor completes the drive train between the main power shaft 16 and the motor.

In this instance, the rotative drive for the work spindle 10 is taken from the main shaft 16 by means of a pinion 25 fast on the main shaft and engaging a larger pinion 26 on a shaft 27. The latter, acting through gearing 28, drives a horizontal shaft 29 which is connected to still another horizontal shaft 30 by change gearing 31. A splined shaft 32 is operatively connected to the shaft 30 by bevel gears 33 and 34 and slidably carries a worm 35, the latter meshing with a worm wheel 36 on the work spindle 10 to rotate the workpiece W. The sliding connection between the splined shaft 32 and the worm 35 enables vertical movement of the workpiece W relative to the hob 11.

Rotation of the main shaft 16 is imparted to the hob spindle 12 through a bevel gear 37 on the main shaft meshing with a similar gear 38 on a vertical shaft 39 which drives a horizontal shaft 40 by means of bevel gears 41 and 42. The shaft 40 is connected to the hob spindle by a pinion 43 on the shaft and a gear 44 on the spindle. The pinion 43 is elongated so that the gear 44 may slide therealong when the hob spindle is fed tangentially of the workpiece W while the bevel gear 37 is splined to the main shaft 16 for axial movement along the latter to accommodate shifting of the carriage 13 and axial feeding of the hob spindle.

In designing a hobbing machine, it is customary first to determine the range through which the rotational speed of the hob 11 is to be varied and then to select a drive arrangement suitable to achieve this range. Accordingly, the speed capacity of the motor 15 and the reduction ratio of the gearing between the motor, the main shaft 16 and the hob spindle 12 are chosen primarily as functions of desired hob speeds. For a given drive train, it is also desirable to have the feed of the hob responsive to hob rotation, and thus, the drive for feeding the hob usually is taken from the main shaft 16 or from some other shaft which is rotated in timed relation with the hob. As a result, the available range of feed rate is limited because the input variation to the feed drive shaft is fixed in accordance with the selected range of hob speeds.

Accordingly, the present invention contemplates a new and improved drive mechanism which not only feeds the hod in response to hob rotation, but which also is capable of varying the feed rate of the hob through a range significantly wider than the ranges previously available. To these ends, the motion of the main shaft 16 is combined by differential gearing 45 with the motion of a variable speed secondary power source 46, and the resultant motion produced by the output of the differential is employed to feed the hob. Since the main shaft also is used to rotate the hob, the hob feed is responsive to the hob rotation and yet the hob may be fed at various rates supplemented by and correlated with the selected speed of the secondary power source.

Preferably, the secondary power source 46 is a reversible hydraulic motor operable through a wide range of speeds such as from 10 to 3600 r.p.m. The motor is connected by fluid lines 47 to a pump (not shown) which may be driven by the primary drive motor 15. Interposed in the fluid lines between the pump and the hydraulic motor is a control valve 48 for adjusting the speed of the motor and also for changing the direction of its rotation.

In this instance, the differential 45 for combining the motions of the main shaft 16 and the hydraulic motor 46 comprises a cage formed by a spindle 49 extending between and rotatively journaled in a pair of spaced spiders 50 and 51. The spider 50 is journaled for rotation on the main shaft 16, the latter constituting one input of the differential and carrying a sun gear 52 on its end meshing with a planetary gear 53 fast on the spindle 49. Similarly, the spider 51 is mounted for rotation on a shaft 54 which constitutes the output of the differential and which is connected by a sun gear 55 with a second planetary gear 56 keyed to the spindle 49. In order to transmit the motion of the hydraulic motor to the differential, a pinion 57 on the drive shaft 58 of the motor meshes with a series of gear teeth formed around the periphery of the spider 51 to rotate the cage about the shafts 16 and 54. The spider 51 thus may be considered to constitute the other input element of the differential.

If the hydraulic motor 46 is not in use, the cage of the differential 45 is held stationary and the output shaft 54 rotates in timed relation with the main shaft 16. When the motor is operating, however, the cage will rotate about the shafts 16 and 54 to advance or retard the rotation of the output shaft relative to the main shaft. With this arrangement, the speed of the hydraulic motor either may be added to or subtracted from the speed of the main shaft 16 and thus the speed of the output shaft 54 may be greater or less than that of the main shaft depending upon the direction of rotation of the hydraulic motor.

While the output shaft 54 of the differential 45 may be employed to feed the hob spindle 12 in various directions, it is used herein to feed the hob spindle and the hob 11 axially of the work spindle 10. For this purpose, a bevel gear 60 on the end of the output shaft 54 meshes with a similar gear 61 located intermediate the ends of a shaft 62 rotatively coupled to the feed screw 14 by a second set of bevel gears 63 and 64. The feed screw is threadably connected to the carriage 13 by a nut 65, and thus rotation of the output shaft 54 transmitted to the feed screw is effective to advance the carriage and to feed the hob 11 axially of the work spindle 10. Accordingly, the range through which the feed rate may be varied is directly correlated with the variance in speed of the output shaft 54.

When hobbing helical gears, it is necessary to modify the normal timed rotational relation of the hob 11 and the workpiece W to compensate for the helix angle as the axial feed proceeds. In the present instance, this compensation is achieved by varying the rotational speed of the work spindle 10 in accordance with variances in the feed rate and, for this purpose, the gearing 28 also is a differential having one input responsive to the speed of the output shaft 54 of the differential 45. The differential 28 is identical to the differential 45 and comprises a cage formed by a pair of spaced spiders 66 and 67 journaled for rotation on the shafts 27 and 29, respectively, and interconnected by a spindle 68. A sun gear 69 on the end of the shaft 27 meshes with a planetary gear 70 keyed to the spindle 68 to form one input of the differential 28 while a sun gear 71 on the shaft 29 engages a second planetary gear 72 fast on the spindle 68 to form the differential output. The other input for the differential 28 is picked off of the output of the differential 45 and herein comprises a horizontal shaft 73 carrying a bevel gear 74 which meshes with a bevel gear 75 on the end of the shaft 62. The horizontal shaft 73 drives a further shaft 76 through change gears 77, and the shaft 76, in turn, is connected by bevel gears 78 to still another shaft 79. Fast on the latter shaft is a worm 80 which meshes with teeth formed around the spider 67 to complete the drive train between the differentials. As a result of this arrangement, a variance in the rotation of the output shaft 54 of the differential 45, and thus a variance in the feed rate, is transmitted to the differential 28 to advance or retard the rotation of the shaft 29 and the work spindle 10 so that the rotary phase relation between the workpiece W and the hob 11 is adjusted as the feed rate is changed.

In order to demonstrate the advantages afforded by the present drive arrangement, let it be assumed that it is possible to vary the rotational rate of the main shaft 16 from 90 to 900 r.p.m. while still maintaining the desired range in the rotational speed of the hob 11. Thus, the ratio of maximum feed rate to minimum feed rate would be 10 to 1 if the main shaft 16 alone should be used to drive the output shaft 54 of the differential 45. On the other hand, if the hydraulic motor 46 itself should be directly connected to the shaft 54 without employing the differential 45, the ratio of the maximum to the minimum feed rate would be determined by the speed range of the motor. Thus, assuming that the motor has a speed range of 10 to 3600 r.p.m., the feed rate ratio would be 360 to 1.

By combining the motions of the main shaft 16 and the motor 46 through the differential 45, however, it is possible to vary the speed of the output shaft 54 from 1 to 4500 r.p.m. and, as a result, to obtain a feed rate ratio as high as 4500 to 1. For example, by rotating the main shaft 16 at 90 r.p.m. and by subtracting 89 r.p.m. by means of the hydraulic motor acting in an opposite direction through the differential, the speed of the output shaft 54 may be reduced to 1 r.p.m. On the other hand, by adding the maximum speed of the main shaft (900 r.p.m.) to the maximum speed of the motor (3600 r.p.m.), it is possible to increase the speed of the output shift 54 to 4500 r.p.m. Since the feed rate is directly correlated with the speed of the output shaft, the present arrangement enables a feed rate ratio as high as 4500 to 1 which is more than 10 times greater than the ratio obtainable with the hydraulic motor alone and 450 times greater than the ratio obtainable when the main shaft 16 directly drives the output shaft 54.

To illustrate further the flexibility of the improved drive, let it be assumed that a constant hob rotational speed is necessary so that the speed of the main shaft 16 remains fixed, as for example at 90 r.p.m. In this instance, the speed of the output shaft may be varied in any increment from 1 to 80 r.p.m. by subtracting the motion of the hydraulic motor 46 through the differential 45, and the output speed may be varied in any increment from 100 to 3690 r.p.m. by adding the motion of the motor through the differential. Moreover, the output shaft 54 may be rotated at 90 r.p.m. by holding the cage of the differential 45 stationary and driving the output shaft 54 directly by the main shaft 16. Accordingly, the speed of the output shaft 54, and thus the feed rate, may be varied over a wide range even though the main shaft is rotated at a constant speed. The only limitations within this range are from 80 to 90 r.p.m. and from 90 to 100 r.p.m. due to the minimum speed of the hydraulic motor.

I claim as my invention:

1. In a hobbing machine, the combination of, a work spindle for supporting a workpiece during a hobbing operation, a tool spindle operable to hold a hob for cutting teeth on a workpiece on said work spindle, a shiftable carriage for feeding said tool spindle axially of said work spindle, a primary rotary power source, a drive train connecting said power source to said tool spindle for rotating the latter at a predetermined speed, said drive train including a shaft coupled to said work spindle for rotating the work spindle in normal timed relation with the tool spindle to maintain the hob in proper cutting relation with the workpiece, differential gearing having two input elemens and having an output element drivingly connected to said carriage for shifting the same and for feeding said tool spindle, said shaft being coupled with one of said input elements for rotating said one input element in timed relation with the rotation of said tool spindle, a secondary reversible power source operable at various selected speeds, said secondary power source being connected to the other of said input elements for rotating the latter in accordance with the selected speed and direction of the secondary power source whereby the rotational rate of said output element and the feed rate of said tool spindle are determined by the resultant motions of said shaft and said secondary power source and vary in response to changes in speed and direction of the secondary power source, and means connected to said output element for modifying the normal timed rotational relation of said spindles in response to changes in the feed rate of said tool spindle.

2. In a hobbing machine, the combination of, a work spindle for supporting a workpiece during a hobbing operation, a tool spindle operable to hold a hob for cutting teeth on a workpiece on said work spindle, a shiftable carriage for feeding one of said spindles bodily relative to the other of said spindles, a primary rotary power source, a drive train connecting said power source to said tool spindle for rotating the latter at a speed correlated with the speed of the power source, said drive train including a rotatable shaft coupled to said work spindle for rotating the work spindle in timed relation with the tool spindle to maintain the hob in proper cutting relation with the workpiece, a secondary rotary power source operable at various selected speeds, and differential means having input elements connected to be rotated by said drive train and said secondary power source and having an output element connected to apply the resultant rotation of the input elements to said carriage to shift the latter whereby the feed rate of said one spindle is determined both by the speed of the primary power source and the selected speed of the secondary power source.

3. A hobbing machine as defined in claim 2 in which said secondary power source comprises a reversible hydraulic motor operable over a wide range of speeds.

4. In a machine tool, the combination of, a work spindle for supporting a workpiece during a machining operation, a tool spindle operable to hold a cutter for machining a workpiece on said work spindle, a shiftable carriage supporting one of said spindles for bodily movement relative to the other of said spindles, a primary rotary power source connected to said tool spindle and to said work spindle for rotating the spindles in timed relation with each other, a secondary rotary power source operable at various selected speeds, and means for combining the motions of said power sources and applying the resultant motion ot said carriage to shift the latter whereby the carriage may be shifted at various rates correlated with the speed of the primary power source and the selected speed at the secondary power source.

5. A machine tool as defined in claim 4 in which said means comprises differential gearing having input elements actuated by said power sources and having an output element rotated in accordance with the resultant of the input motions and connected to said carriage.

References Cited
UNITED STATES PATENTS

| | | | |
|---|---|---|---|
| 2,364,932 | 12/1944 | Warner et al. | 90—4 |
| 2,419,726 | 4/1947 | Pelphrey | 90—4 |
| 2,563,982 | 8/1951 | Warner | 90—4 |

FOREIGN PATENTS

| | | |
|---|---|---|
| 607,057 | 8/1948 | Great Britain. |

ANDREW R. JUHASZ, *Primary Examiner.*

G. WEIDENFELD, *Assistant Examiner.*

U.S. Cl. X.R.

74—665